US012688220B2

(12) United States Patent
Sultan et al.

(10) Patent No.: US 12,688,220 B2
(45) Date of Patent: Jul. 21, 2026

(54) MODEL PERFORMANCE THROUGH TEXT-TO-TEXT TRANSFORMATION VIA DISTANT SUPERVISION FROM TARGET AND AUXILIARY TASKS

(71) Applicant: INTERNATIONAL BUSINESS MACHINES CORPORATION, Armonk, NY (US)

(72) Inventors: Md Arafat Sultan, Croton-on-Hudson, NY (US); Efsun Kayi, Bedford Corners, NY (US); Revanth Gangi Reddy, Hyderabad (IN); Rong Zhang, Syosset, NY (US); Avirup Sil, Hopewell Junction, NY (US); Vittorio Castelli, Croton-on-Hudson, NY (US)

(73) Assignee: International Business Machines Corporation, Armonk, NY (US)

( * ) Notice: Subject to any disclaimer, the term of this patent is extended or adjusted under 35 U.S.C. 154(b) by 682 days.

(21) Appl. No.: 17/316,670

(22) Filed: May 10, 2021

(65) Prior Publication Data

US 2022/0358152 A1 Nov. 10, 2022

(51) Int. Cl.
*G06F 16/34* (2025.01)
*G06F 16/20* (2019.01)
(Continued)

(52) U.S. Cl.
CPC .......... *G06F 16/345* (2019.01); *G06F 18/214* (2023.01); *G06F 40/10* (2020.01); *G06F 40/20* (2020.01); *G06N 20/00* (2019.01)

(58) Field of Classification Search
CPC ........ G06F 16/345; G06F 40/10; G06F 40/20; G06F 18/214; G06N 20/00
See application file for complete search history.

(56) References Cited

U.S. PATENT DOCUMENTS 8,694,474 B2* 4/2014 Wu ..................... H03M 7/3077
707/693
2012/0197630 A1* 8/2012 Lyons ................... G06F 16/345
704/9

(Continued)

FOREIGN PATENT DOCUMENTS

CN 106503231 B1 2/2020

OTHER PUBLICATIONS

Lam, W. et al., "A Continuously Growing Dataset of Sentential Paraphrases"; Proceedings of the 2017 Conference on Empirical Methods in Natural Language Processing (2017); pp. 1224-1234.

(Continued)

*Primary Examiner* — Richemond Dorvil
*Assistant Examiner* — Ethan Daniel Kim
(74) *Attorney, Agent, or Firm* — CHIP LAW GROUP

(57) ABSTRACT
A computer-implemented method of performing text-to-text transformation includes performing a text transformation operation on an original input text of a specific task to generate a plurality of transformed text. A task-specific performance metric that measures an operation of the specific task is applied to each one of the plurality of transformed text. Each of the plurality of transformed text are paired with the task-specific performance metric. A training dataset is updated to include each pairing of the plurality of transformed text with the task-specific metric.

19 Claims, 11 Drawing Sheets

(51) Int. Cl.

| | |
|---|---|
| *G06F 18/214* | (2023.01) |
| *G06F 40/10* | (2020.01) |
| *G06F 40/20* | (2020.01) |
| *G06N 20/00* | (2019.01) |

(56) References Cited

U.S. PATENT DOCUMENTS

| | | | | |
|---|---|---|---|---|
| 2013/0080164 A1* | 3/2013 | Zanolin | ............... | G06F 40/232 |
| | | | | 704/E15.044 |
| 2014/0189501 A1 | 7/2014 | Demiralp et al. | | |
| 2017/0075985 A1 | 3/2017 | Chakraborty | | |
| 2017/0161372 A1* | 6/2017 | Fernandez | ........... | G06F 40/211 |
| 2019/0325259 A1* | 10/2019 | Murphy | ............. | G06F 18/2148 |
| 2020/0034432 A1 | 1/2020 | Jain et al. | | |
| 2020/0074999 A1* | 3/2020 | Elliott | ............... | G06F 16/9024 |
| 2020/0250477 A1* | 8/2020 | Barthur | .............. | G06F 11/0751 |
| 2020/0257858 A1* | 8/2020 | Awadallah | ............. | G06F 40/30 |
| 2020/0405207 A1* | 12/2020 | Beasley | ............ | A61B 5/14546 |

OTHER PUBLICATIONS

Zhang, S., "Addressing Semantic Drift in Question Generation for Semi-Supervised Question Answering"; arXiv:1909.06356v1 (2019); 15 pgs.

Ji, G. et al., "Distant Supervision for Relation Extraction with Sentence-Level Attention and Entity Descriptions"; Proceedings of the Thirty-First AAAI Conference on Artificial Intelligence (2017); 7 pgs.

Mintz, M., "Distant Supervision for Relation Extraction without Labeled Data"; Proceedings of the 47th Annual Meeting of the ACL and the 4th IJCNLP of the AFNLP (2009); 9 pgs.

Ishigaki, T. et al., "Distant Supervision for Extractive Question Summarization"; ECIR (2020); pp. 182-189.

Abacha, A. B., et al., "On the Role of Question Summarization and Information Source Restriction in Consumer Health Question Answering"; AMIA Jt Summits Transl Sci Proc. (2019); pp. 117-126.

Xu, Y. et al., "Query Focused Multi-Document Summarization with Distant Supervision"; arXiv:2004.03027v1 (2020); 11 pgs.

Savery, M., et al., "Question-Driven Summarization of Answers to Consumer Health Questions"; arXiv:2005.09067v2 (2020); 13 pgs.

Nakov, P. et al., "SemEval-2017 Task 3: Community Question Answering"; Proceedings of the 11th International Workshop on Semantic Evaluations (SemEval-2017), pp. 27-48.

Lei, T., et al., "Semi-supervised Question Retrieval with Gated Convolutions"; Proceedings of NAACL-HLT (2016); pp. 1279-1289.

Ishigaki, T. et al., "Summarizing Lengthy Questions"; Proceedings of the The 8th International Joint Conference on Natural Language Processing (2017); pp. 792-800.

Sharp, R. et al., "Tell Me Why: Using Question Answering as Distant Supervision for Answer Justification"; Proceedings of the 21st Conference on Computational Natural Language Learning (2017); pp. 69-79.

Castelli, V. et al., "The TechQA Dataset"; Proceedings of the 58th Annual Meeting of the Association for Computational Linguistics (2020); pp. 1269-1278.

Felbo, B. et al., "Using Millions of Emoji Occurrences to Learn Any-Domain Representations for Detecting Sentiment, Emotion and Sarcasm"; arXiv:1708.00524v2 (2017); 13 pgs.

Mell, P. et al., "Recommendations of the National Institute of Standards and Technology"; NIST Special Publication 800-145 (2011); 7 pgs.

Liu et al., "Text Summarization with Pretrained Encoders", Proceedings of the 2019 Conference on Empirical Methods in Natural Language Processing and the 9th International Joint Conference on Natural Language Processing, Nov. 3-7, 2019, pp. 3730-3740.

Qin et al., "Robust Distant Supervision Relation Extraction via Deep Reinforcement Learning", arXiv:1805.09927v1 [cs.CL], May 24, 2018, 11 pages.

Shah et al., "Adversarial domain adaptation for duplicate question detection", Proceedings of the 2018 Conference on Empirical Methods in Natural Language Processing, Oct. 31-Nov. 4, 2018, pp. 1056-1063.

* cited by examiner

Transforming questions for answer ranking

Decoding

• Task: Duplicate question detection Transformation: Question compression/summarization by dropping sentences.

• Evaluation Metric: MAP

| Fold | Original | With T3 Model |
|------|----------|---------------|
| Dev | 0.53 | 0.76 |
| Test | 0.54 | 0.70 |

| Dataset | Model | Original Data | Best Compressions | After Transformation |
|---------|-------|---------------|-------------------|----------------------|
| Dev | Baseline Ranker | 0.530 | 0.781 | 0.556 |
| | Compressed Ranker | 0.473 | 0.795 | 0.760 |
| Test | Baseline Ranker | 0.542 | 0.767 | 0.558 |
| | Compressed Ranker | 0.505 | 0.787 | 0.699 |

705    710    715    720    725    730

700

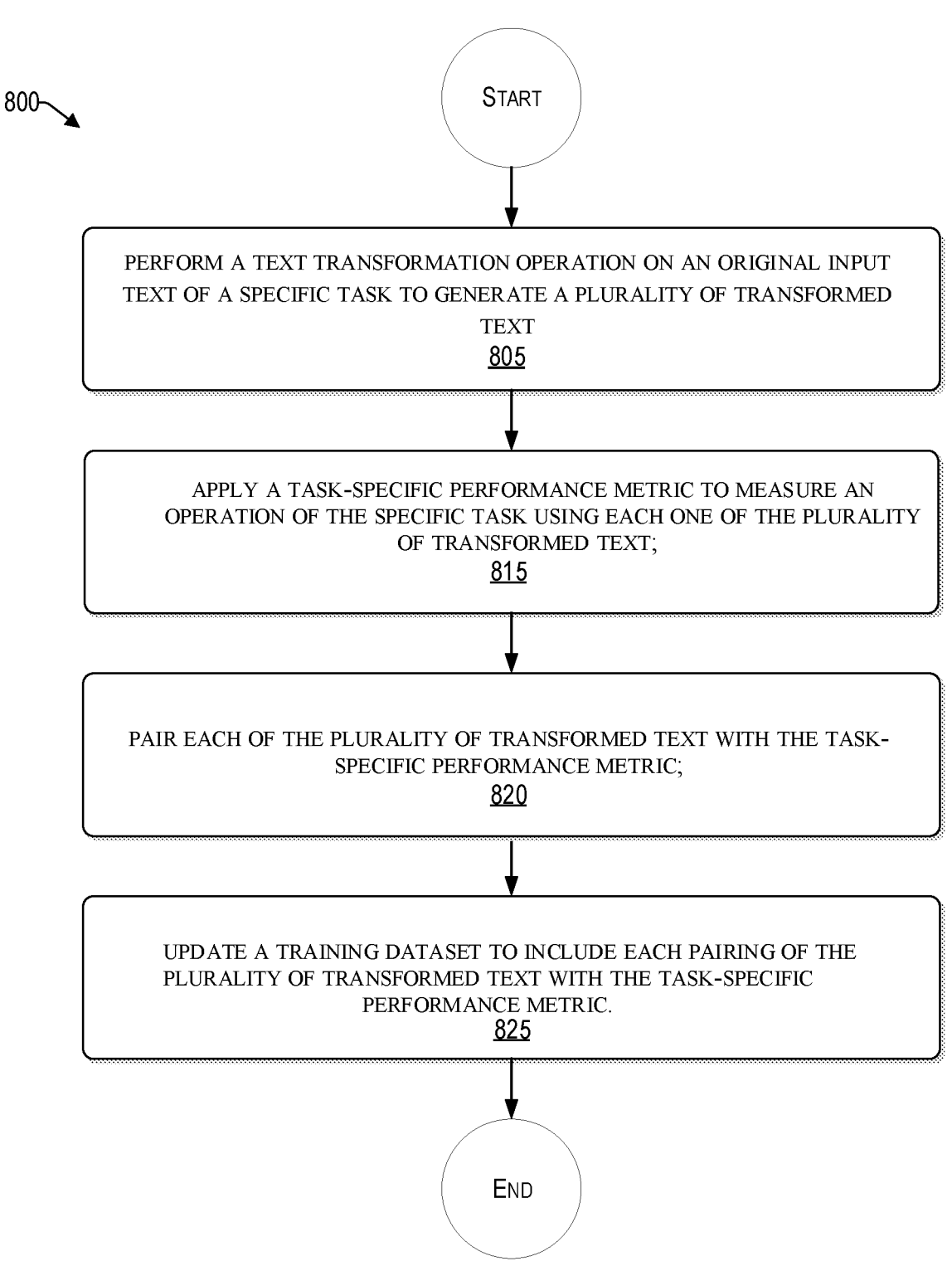

800

START

PERFORM A TEXT TRANSFORMATION OPERATION ON AN ORIGINAL INPUT TEXT OF A SPECIFIC TASK TO GENERATE A PLURALITY OF TRANSFORMED TEXT
805

APPLY A TASK-SPECIFIC PERFORMANCE METRIC TO MEASURE AN OPERATION OF THE SPECIFIC TASK USING EACH ONE OF THE PLURALITY OF TRANSFORMED TEXT;
815

PAIR EACH OF THE PLURALITY OF TRANSFORMED TEXT WITH THE TASK-SPECIFIC PERFORMANCE METRIC;
820

UPDATE A TRAINING DATASET TO INCLUDE EACH PAIRING OF THE PLURALITY OF TRANSFORMED TEXT WITH THE TASK-SPECIFIC PERFORMANCE METRIC.
825

END

FIG. 8

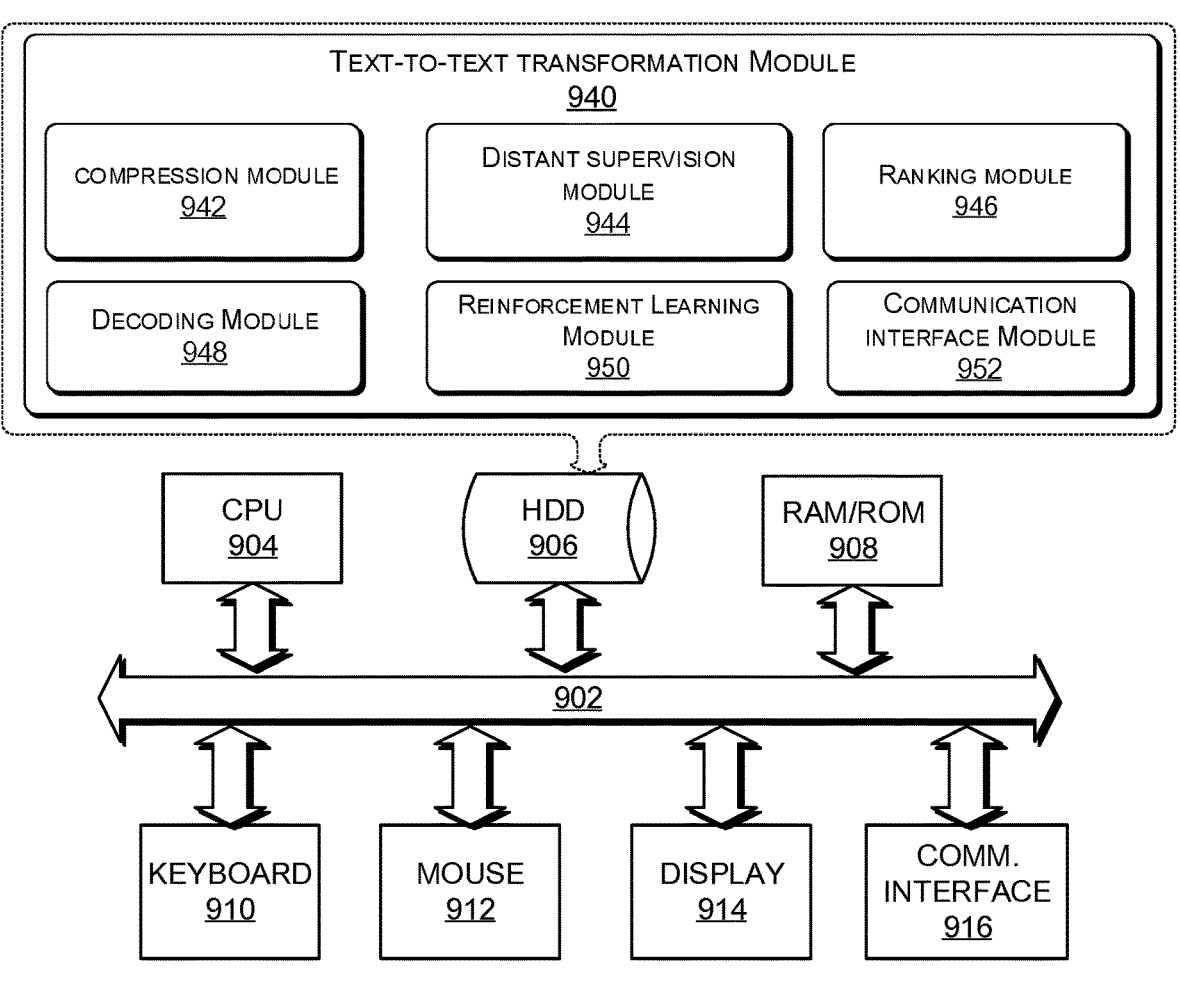
FIG. 9

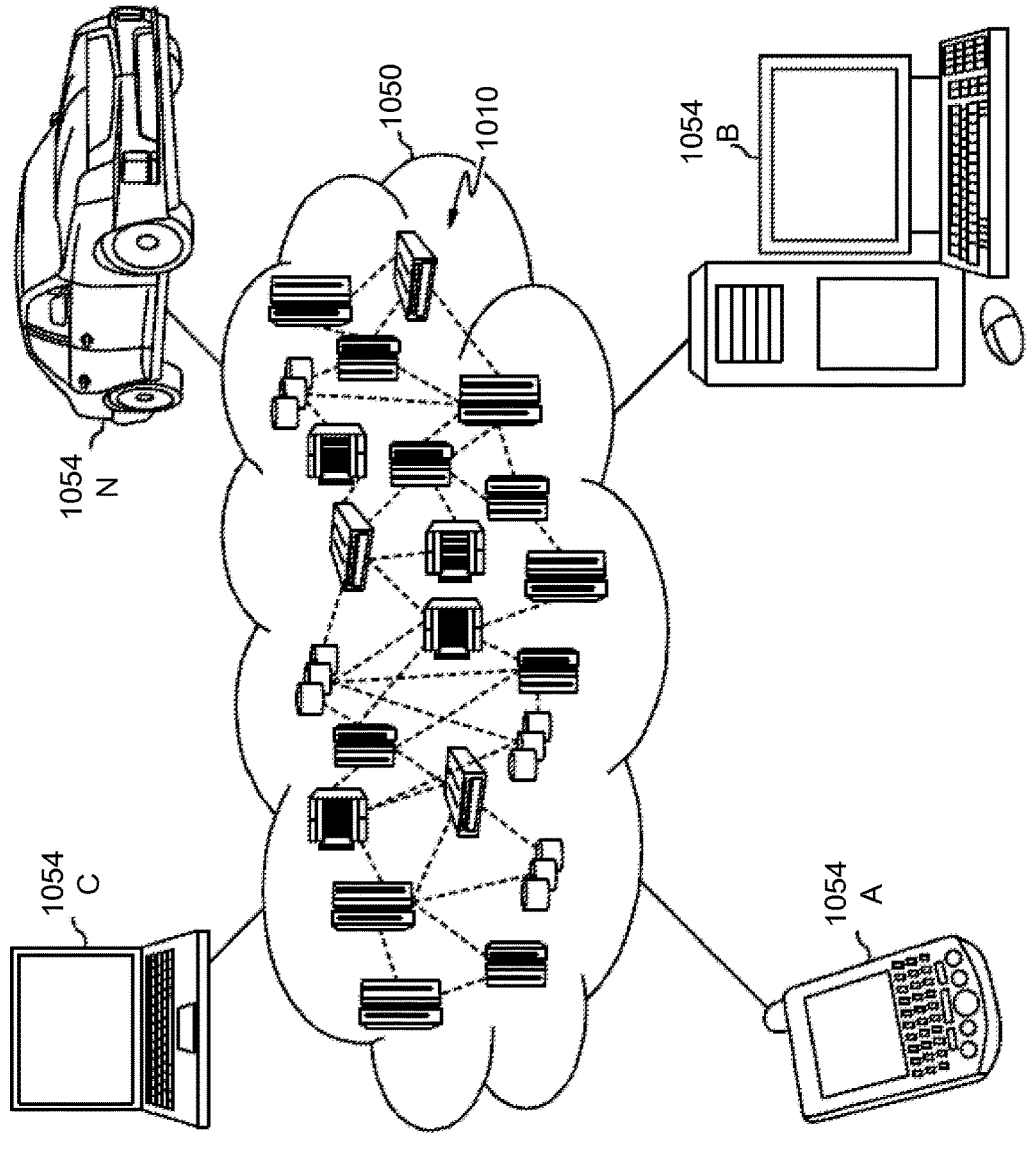
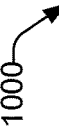
FIG. 10

MODEL PERFORMANCE THROUGH TEXT-TO-TEXT TRANSFORMATION VIA DISTANT SUPERVISION FROM TARGET AND AUXILIARY TASKS

BACKGROUND

Technical Field

The present disclosure generally relates to systems and methods of Natural Language Processing, and more particularly, to text-to-text transformation performed by statistical models.

Description of the Related Art

Natural Language Processing (NLP) is used to teach computers to understand how humans interact with machines both via input speech and text. Some NLP problems can be solved more accurately and efficiently with a transformed version of an original input. Text-to-text transformation is a way to modify the original input from a user to a new form that works better for the computer to perform the specific task(s) of interest to a user.

There are shortcomings in the application of text-to-text transformation to provide for more accurate and efficient NLP, including but not limited to performing a target task. In general, text-to-text transformation is performed using statistical models trained on labeled data. However, training example for such transformation operations are not always available, and the generation of labeled data can be time consuming and expensive to perform a particular target task.

SUMMARY

According to one embodiment, a computer-implemented method of performing text-to-text transformation includes performing a text transformation operation on an original input text of a specific task to generate a plurality of transformed text. A task-specific performance metric that measures an operation of the specific task is applied to each one of the plurality of transformed text. Each of the plurality of transformed text are paired with the task-specific performance metric. A training dataset is updated to include each pairing of the plurality of transformed text with the task-specific metric. This text-to-text transformation increases the performance of a model by providing better data for training and obtaining inferences.

In one embodiment, each pairing is provided to the training dataset after determining whether a quality criterion is satisfied. The lower-quality pairings are not providing to the training dataset to increase the accuracy and speed of a model.

In one embodiment, the specific task includes at least one target task provided in the original text. The method further includes: performing a distant supervision of the text transformation operation based on a set of related auxiliary tasks having labeled data in addition to a data of the at least one target task. The distant supervision allows for more efficient generating of training data by using the labeled data of auxiliary tasks as part of the training dataset. A more accurate model is trained in cases where there is little or no training data for the original input text, and the time and costs of generating a training dataset for the model is reduced.

In one embodiment, the computer-implemented method further includes performing a new text transformation operation using the updated training dataset to generate a new plurality of transformed text. The task-specific performance metric is applied to measure an operation of the specific task using each of the new plurality of transformed text. Each of the new plurality of transformed text is paired with the task-specific performance metric, and the training dataset is updated to include each pairing of the new plurality of transformed text with the task-specific metric. A more accurate and faster answer to an input can be provided by the model by using the transformed text, rather than the original input text, to perform a task.

In one embodiment, the labeled data of the related auxiliary tasks includes question and answer (QA) pairs. The text transformation operation further includes generating a plurality of question compression candidates from the QA pairs and selecting one or more of the compression candidates based on an answer ranking of the QA pairs. Question compression and QA pairing provides for accurate training and speed in the performance of a model.

In one embodiment, the question compression candidates are based on a number of words in the original text. The text transformation operation includes compressing questions by providing a summary of the question compression candidates using fewer words than in the original text. Question compression provides for accurate training and speed in the performance of a model.

In one embodiment, the updating of the training data set is performed iteratively after performing a successively new text transformation operation, applying the task-specific performance metric, and pairing each successively new transformed text until a terminating criterion is satisfied. The iterations enhance the accuracy of the training dataset.

In one embodiment, for each successively new text transformation operation, the pairing of the newly successive transformed text and the task-specific performance metric is provided to the training dataset after determining whether a quality criterion is satisfied. The use of the quality criterion enhances the accuracy of the training dataset.

In one embodiment, the specific task is answering a question.

In one embodiment, the text transformation operation further includes providing an answer to a question embedded in one or more one or relevant portions of the question. More accurate answers to questions can be provided is less time by using the relevant portions of a model.

In one embodiment, the providing of an answer includes discarding at least one non-selected portion of the question upon determining that the non-selected portion of the question is at least one of irrelevant to providing the answer to the question, or redundant to at least a part of the selected relevant portions of the question. More accurate answers to questions can be provided is less time by using the relevant portions of a model.

According to one embodiment, a computer-implemented method of performing text-to-text transformation includes receiving training examples related to an original text of a specific task. A text-to-text transformation operation of an original text is performed to generate training examples of a transformed text. A machine learning model is trained to perform Natural Language Processing (NLP) based upon a training data comprising the training examples of the original text and the training examples of the transformed text. A test data including a new original text for transformation is received. The new original text is transformed into new transformed text using the trained machine learning model. This text-to-text transformation increases the performance of a model by providing better training data.

In one embodiment, the generated training examples of the transformed text includes a summarizing of the original text. The summary provides a more succinct form of the input text, and the model can perform a task related to the input text more accurately using the summary.

In one embodiment, the generated training examples of the transformed text includes a summarizing and a shortening of the original text. The model can provide a more accurate response by summarizing and shortening the original text.

In one embodiment, the specific task includes at least one target task provided in the original text. The method further includes performing a distant supervision of the text transformation operation based on a set of related auxiliary tasks having labeled data in addition to a data of the at least one target task. The distant supervision allows for more efficient generating of training data by using the labeled data of auxiliary tasks as part of the training dataset. A more accurate model is trained in cases where there is little or no training data for the original input text, and the time and costs of generating a training dataset for the model is reduced.

According to an embodiment, a computing device configured to perform text-to-text transformation includes a processor, a memory coupled to the processor, the memory storing instructions to cause the processor to perform acts that include performing a text transformation operation on an original input text of a specific task to generate a plurality of transformed text. A task-specific performance metric is applied to measure an operation of the specific task using each one of the plurality of transformed texts. Each of the plurality of the transformed text is paired with the task-specific performance metric. A training dataset is updated to include each pairing of the plurality of transformed text with the task-specific metric. The text-to-text transformation increases the performance of a model by providing better training data.

In one embodiment, the specific task includes at least one target task provided in the original text. The instructions cause the processor to perform an additional act of performing a distant supervision of the text transformation operation based on a set of related auxiliary tasks having labeled data in addition to a data of the at least one target task. The distant supervision allows for more efficient generating of training data.

In one embodiment, the labeled data of the related auxiliary tasks includes question and answer (QA) pairs. The instructions cause the processor to perform additional acts of generating a plurality of question compression candidates from the QA pairs and selecting one or more of the compression candidates based on an answer ranking of the QA pairs. Question compression and QA pairing provides for accurate training and speed in the performance of a model.

In one embodiment, the question compression candidates are based on a number of words in the original text. The instructions cause the processor to perform an additional act of compressing questions in the text transformation operation by providing a summary of the question compression candidates using fewer words than in the original text. Question compression provides for accurate training and speed in the performance of a model.

In one embodiment, the instructions cause the processor to perform additional acts of performing a new text transformation operation using the updated training dataset to generate a new plurality of transformed text. The task-specific performance metric is applied to measure an operation of the specific task using each one of the new plurality of transformed text. Each of the new plurality of transformed text is paired with the task-specific performance metric. The training dataset is updated to include each pairing of the new plurality of transformed text with the task-specific metric. The additional transformations enhance the accuracy of the training dataset.

These and other features will become apparent from the following detailed description of illustrative embodiments thereof, which is to be read in connection with the accompanying drawings.

BRIEF DESCRIPTION OF THE DRAWINGS

The drawings are of illustrative embodiments. They do not illustrate all embodiments. Other embodiments may be used in addition to or instead. Details that may be apparent or unnecessary may be omitted to save space or for more effective illustration. Some embodiments may be practiced with additional components or steps and/or without all the components or steps that are illustrated. When the same numeral appears in different drawings, it refers to the same or like components or steps.

FIG. 8 is a flowchart illustrating a computer-implemented method of performing text-to-text transformation, consistent with an illustrative embodiment.

FIG. 9 is a functional block diagram illustration of a computer hardware platform, consistent with an illustrative embodiment.

FIG. 10 depicts an illustrative cloud computing environment, consistent with an illustrative embodiment.

DETAILED DESCRIPTION

Overview

In the following detailed description, numerous specific details are set forth by way of examples to provide a thorough understanding of the relevant teachings. However, it should be understood that the present teachings may be practiced without such details. In other instances, well-known methods, procedures, components, and/or circuitry have been described at a relatively high level, without detail, to avoid unnecessarily obscuring aspects of the present teachings.

As used herein, the term "weak supervision" relates to a type of supervised learning, with uncertainty in the labeling based on, for example, automatic labeling or because the data was labeled by non-experts.

The term "distant supervision" as used herein is to be understood as a form of weak supervision in which an auxiliary automatic mechanism is used to produce weak labels/reference output (e.g., without the data being labeled by a non-expert).

In the present disclosure, a T3 (e.g., a text-to-text trans-formation) framework is used to improve performance on the target task. However, the computer-implemented method and device according to the present disclosure is not limited to using any particular framework.

In an illustrative embodiment, a text-to-text-transforma-tion operation is decoupled from the target task to enhance performance on the target task. By training a model to use the target task to provide distant supervision to the text-to-transformation operation, there is no need for additional annotation data to perform the text-to-text transformation. In addition, the use of auxiliary tasks that are similar but separate from the target task for which labeled data is already available to train model to perform the text-to-text transformation operation.

In an overview, when NLP is used to receive questions that are relatively long, it is beneficial for NLP systems to understand and extract key points before providing an answer. In cases where the original input is a poorly-worded question, it is also beneficial for NLP to perform query reformulation and/or expansion of the original input to improve the performance of an NLP model in terms of accuracy and speed.

Figure 1:
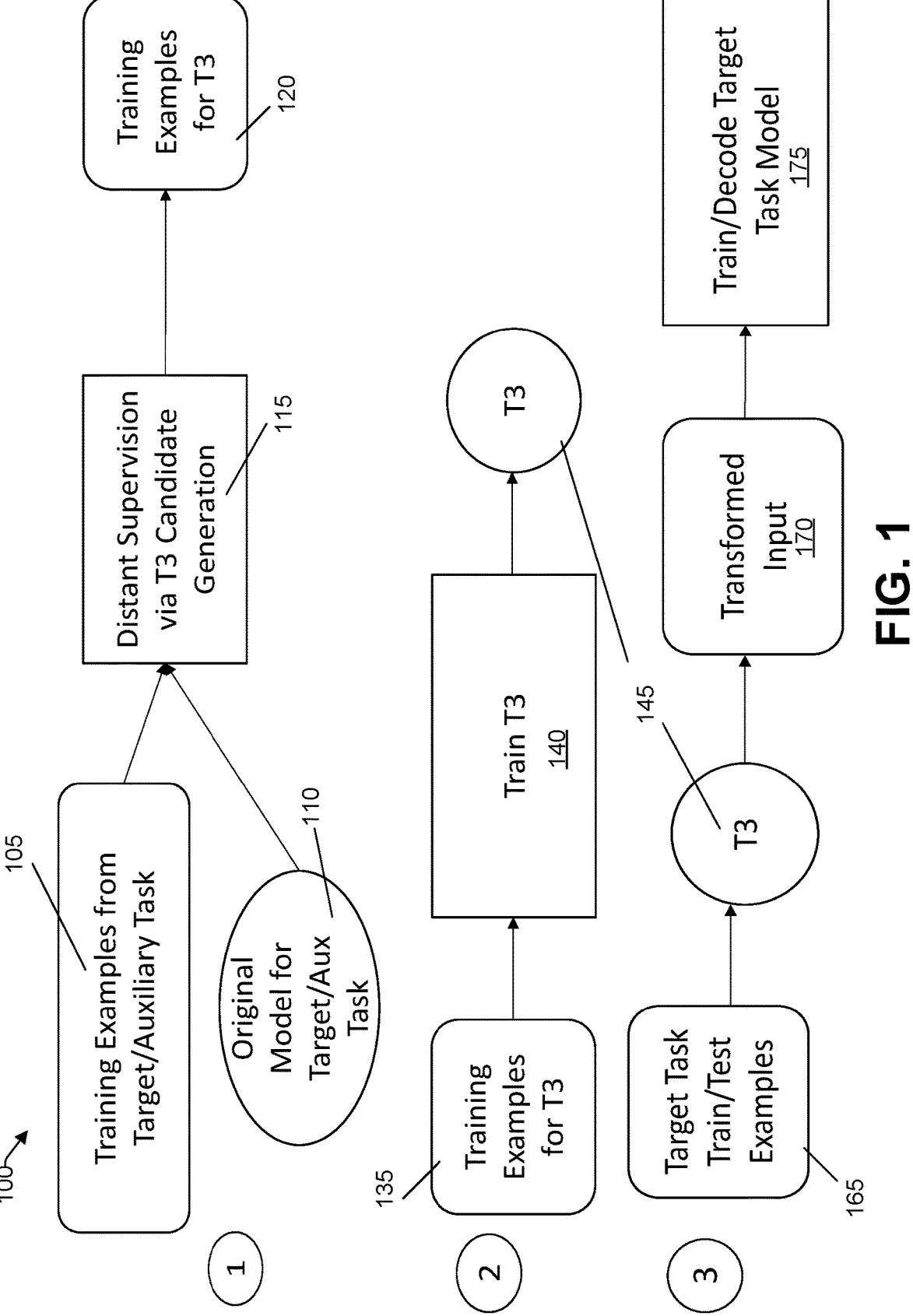
FIG. 1 is an overview of a text-to-text transformation operation, consistent with an illustrative embodiment.

FIG. 1 is an overview 100 illustrating a text-to-text transformation operation, consistent with an illustrative embodiment. FIG. 1 shows three operations labeled 1, 2 and 3, respectively. The first operation trains examples for text-to-text transformation (T3) 120 by utilizing distant supervi-sion for candidate generation 115 of the original target task 110 and an auxiliary task, and training examples from the target and auxiliary tasks 115.

The second operation shows that training examples 135 are used to train a text-to-transformation model 140 to provide transformed text 145 (referred to as T3). In the third operation target task and training text examples 165 utilizing the transformed text T3 is provided to a input 170 (referred to as a transformed input 170 of the original data) to train and/or decode a target task model 175.

The computer-implemented method and computer device of the present disclosure advantageously provides improved performance of input text such as questions by transforming the text into a form that is shorter and often filters extraneous or irrelevant information. An NLP model can find answers more quickly and accurately and constitutes an improvement in text-to-text transformation, as well as an improvement in computer operations. Through the use of distant supervision, the NLP model can be trained with labeled data from auxiliary tasks that are related to a specific task. By virtue of the teachings herein, a reduction in processing overhead and storage can be realized, as well as a reduction in power consumed.

Additional advantages of the computer-implemented method and device of the present disclosure are disclosed herein.

Example Embodiment

Figure 2:
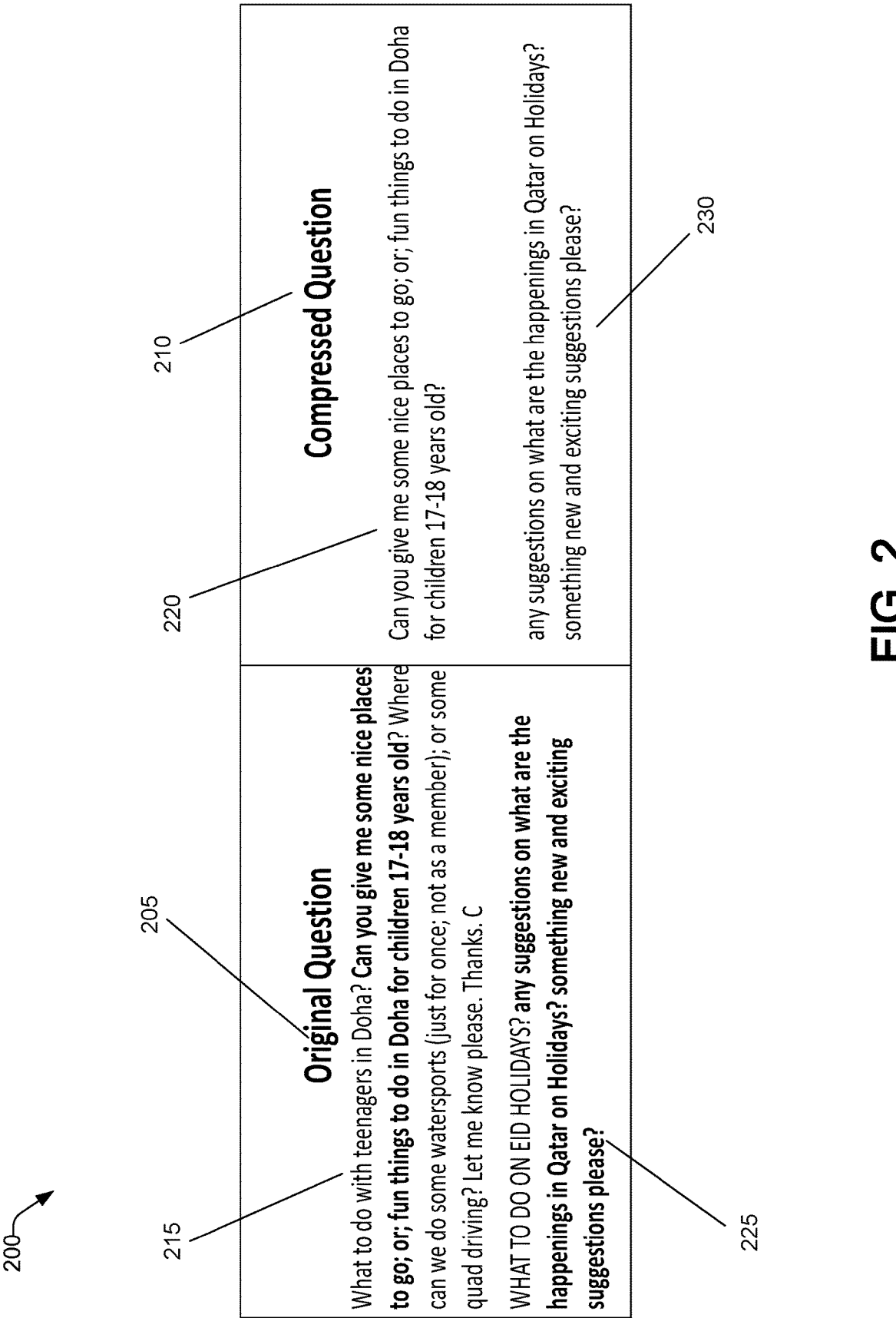
FIG. 2 illustrates some non-exhaustive examples of question compression, consistent with an illustrative embodiment.

FIG. 2 illustrates some non-exhaustive examples 200 of question compression, consistent with an illustrative embodiment. In FIG. 2, the compressed questions 210 provides for a more accurate model performance than the original question 205 because information that is determined to be irrelevant or not one of the main points of the question has been removed. For example, the portion 215 of the original question 205 that asks about what teenagers do in Doha can cause an NLP model to provide results that are not entirely on point in response to the question. For example, in response to portion 215, the NLP model may search for activities for 13 and 14 year old's (teenagers) even though another part of the question specifically states 17-18 year old's. While a human may better understand a question by including context, an NLP model may have a slower response and provide less accurate responses because it lacks the nuance of human thought. The boldface portions of the questions such as asking about what are the happenings in Qatar on holidays 225 is more narrow than the more general "what to do on EID holidays?" which may be understood by an NLP system as being anywhere in the world. Thus, responses that do not have anything to do with Qatar may be provided. Also, the portion of the question of the happenings in Qatar on holidays 225 did not make reference to the EID holiday, so results for other holiday happenings in Qatar may be provided.

Figure 3:
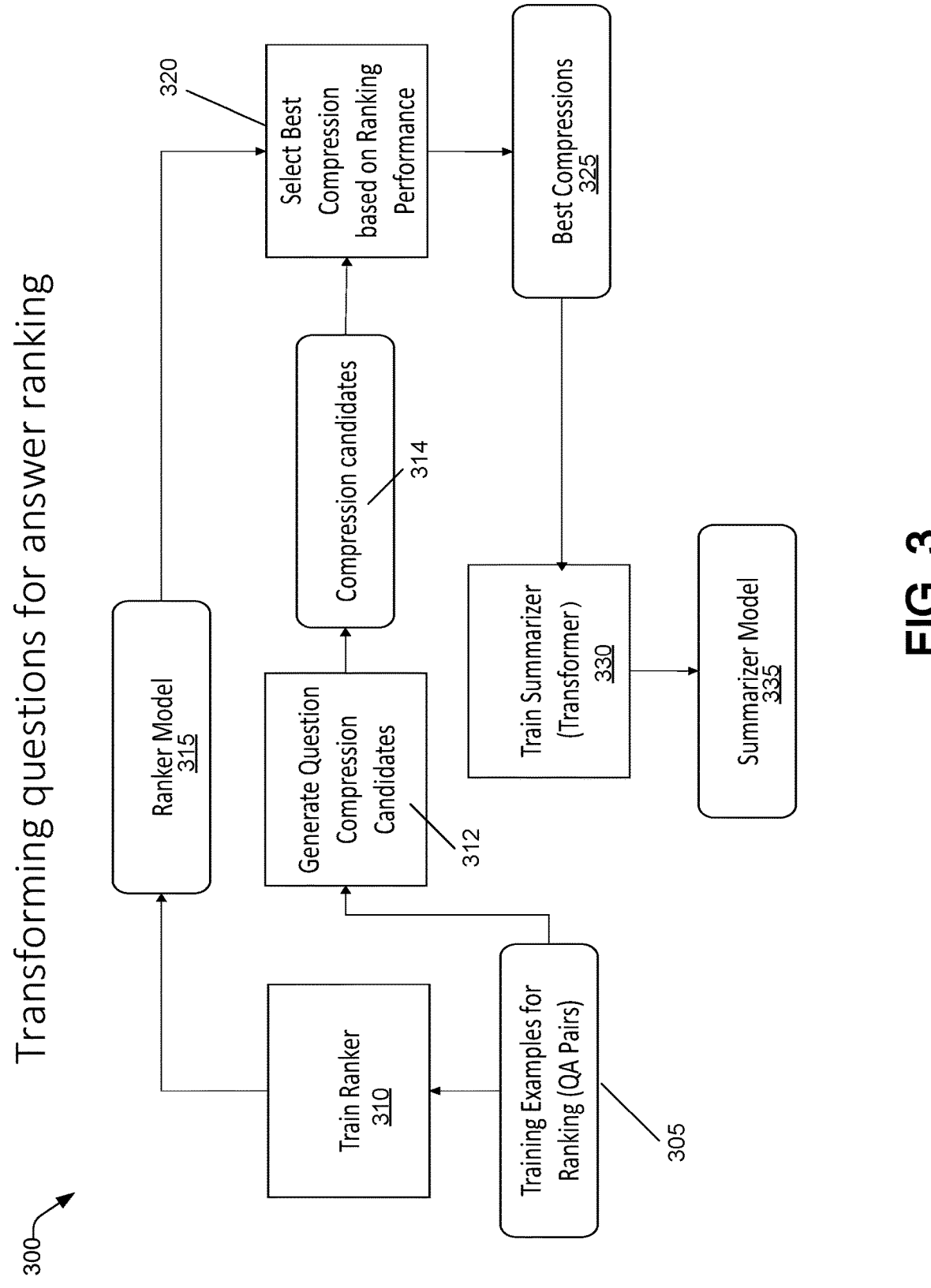
FIG. 3 illustrates an operation of training a model for performing text-to-text transformation, consistent with an illustrative embodiment.

FIG. 3 illustrates an operation 300 of training a model for performing text-to-text transformation, consistent with an illustrative embodiment. The transforming of questions for answer ranking is used for evaluating the Question-Answer (QA) pairs that have been generated by the text-to-text transformation process (transforming original text into transformed text that may be shorter in length or more focused than the original text). As previously discussed, auxiliary tasks that are related to a target task can be used as training examples 305 to general labeled data by distant supervision. QA pairs 305 are evaluated by a ranker training 310 that is trained to rank the QA pairs according to certain criteria, such as compression or accuracy. Such used by the Summarizer Training algorithm 330 to produce a Summa-rizer Model 335.

QA Pairs 305 are used by the Train Ranker algorithm 310 to train Ranker Model 315. Each QA Pair 305 is also used by the generate question compression candidates algorithm 312 to produce a plurality of compression candidates 314. Every compression candidate 314 corresponding to the same training example for ranking is evaluated using ranker model 315 by the Select Best Compression based on Rank-ing Performance algorithm 320, which uses each of a plurality of the compression candidates 314 corresponding to each QA Pair 305 to determine its ranking performance. Step 320 selects the best compression from the plurality of compression candidates 314 corresponding to each the train-ing example for ranking. The collection of selected best compression candidates corresponding to all Training Examples for Ranking 304 constitutes the Best Compres-sions 325 which are used by the Summarizer Training algorithm 330 to produce a Summarizer Model 335.

The ranker model 315 is configured to receive the ranked QA pairs from the train ranker 310 and run tests on the QA pairs to determine the ranking performance. The generate question compression candidates module 312 is configured to generate compression candidates 314 that, for example, may be reduced in size or scope to improve the accuracy of the performance of a specific task. There is a selection of a best compression operation 320 based of the compression candidates 314 and the ranking performance of the QA pairs by the ranker model 315. The best compressions 325, which may be the compression with the highest performance (e.g., as evaluated by a specific performance task metric) are forwarded to a summarizer trainer 330 module. The summarizer trainer 330 then trains the summarizer model 335 to transform text by summarizing of the original input text or additional text as may be provided into a transformed text.

Figure 4:
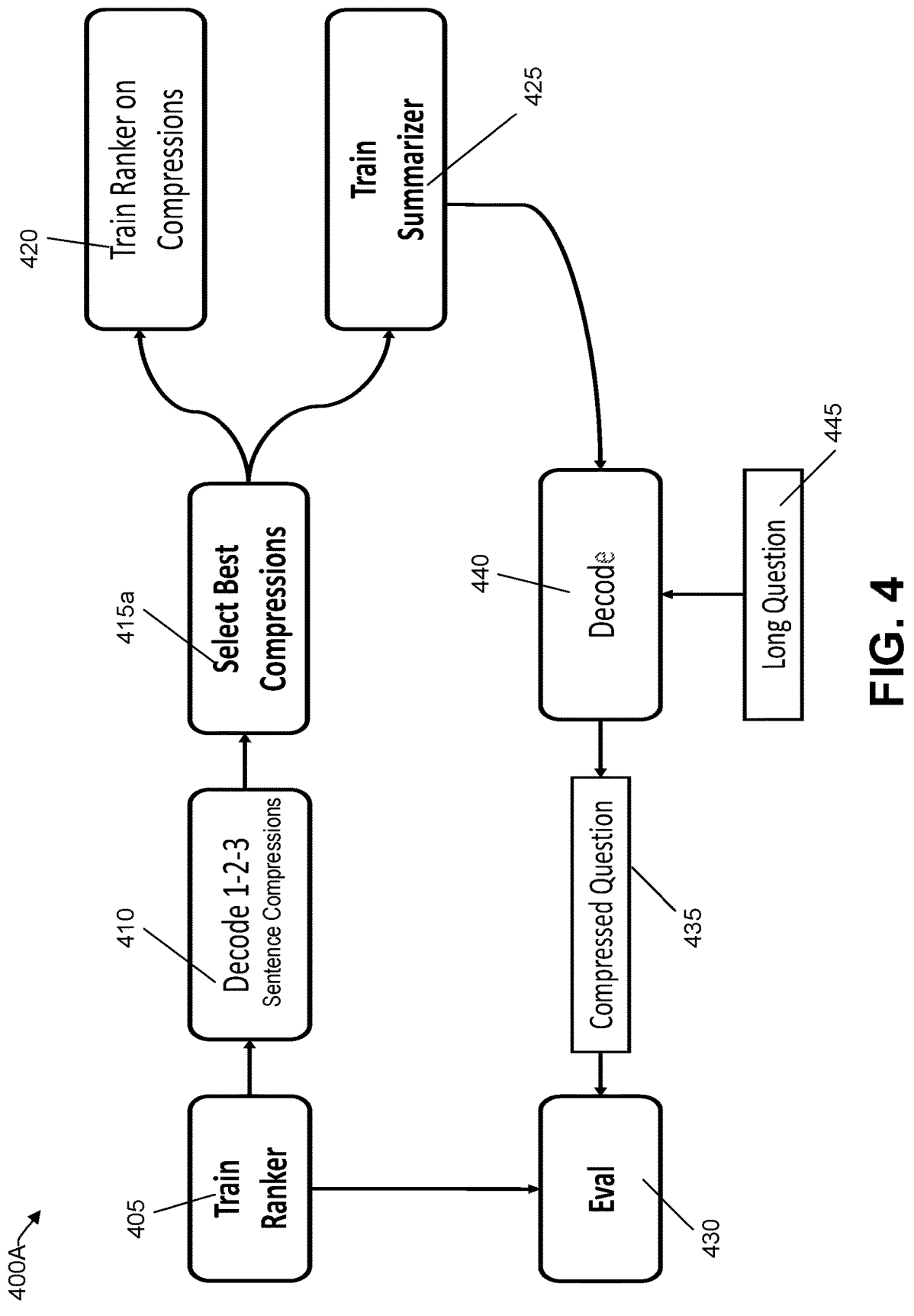
FIG. 4 illustrates answer ranking operations using selected best compressions, consistent with an illustrative embodiment.

FIG. 4 illustrates answer ranking operations using respectively different forms of selected best compressions, consistent with an illustrative embodiment. The answer ranking operations may be performed for duplicate tasks. A long question is compressed into a shorter version for processing by the model. The system is trained to create shorter questions. Shorter questions are often more direct and the model may process a response to an original text input in less time, using fewer computer resources.

With reference to FIG. 4, a long question 445 (an original input text) is decoded 440 with a resultant compressed question. The decoding may include identifying portions of the question (see FIG. 2 for the boldface type). The portions may include several words, phrases or a sentence of a multiple sentence question. The compressed question can be considered to be transformed text as compared with the long question 445. An evaluation metric 430 is a task-specific performance metric that operates to evaluate the performance of the specific task identified in the compressed question 435. The compressed question 435 may include, for example, a plurality of compressed sentences or compressed phrases. Each portion of the transformed text of the compressed question is paired with the task-specific performance metric. A Ranker 405 is trained to rank the portions of the compressed question (such as compressed sentence or compressed phrases). The ranker 405 may be trained to rank the compressed questions with labeled data from one or more auxiliary tasks from similar tasks. There is a decoding operation 410 to identify the ranked sentence compression in order. At operation 415a, the best compression (e.g., one or more compressions with the highest ranking) is selected, and the ranker is trained 420 to rank the best compressions. In addition, a summarizer 425 is trained with the selected best compressions. The summarizer, by being trained with the selected best compression, is able to summarize the long questions more accurately.

Figure 5:
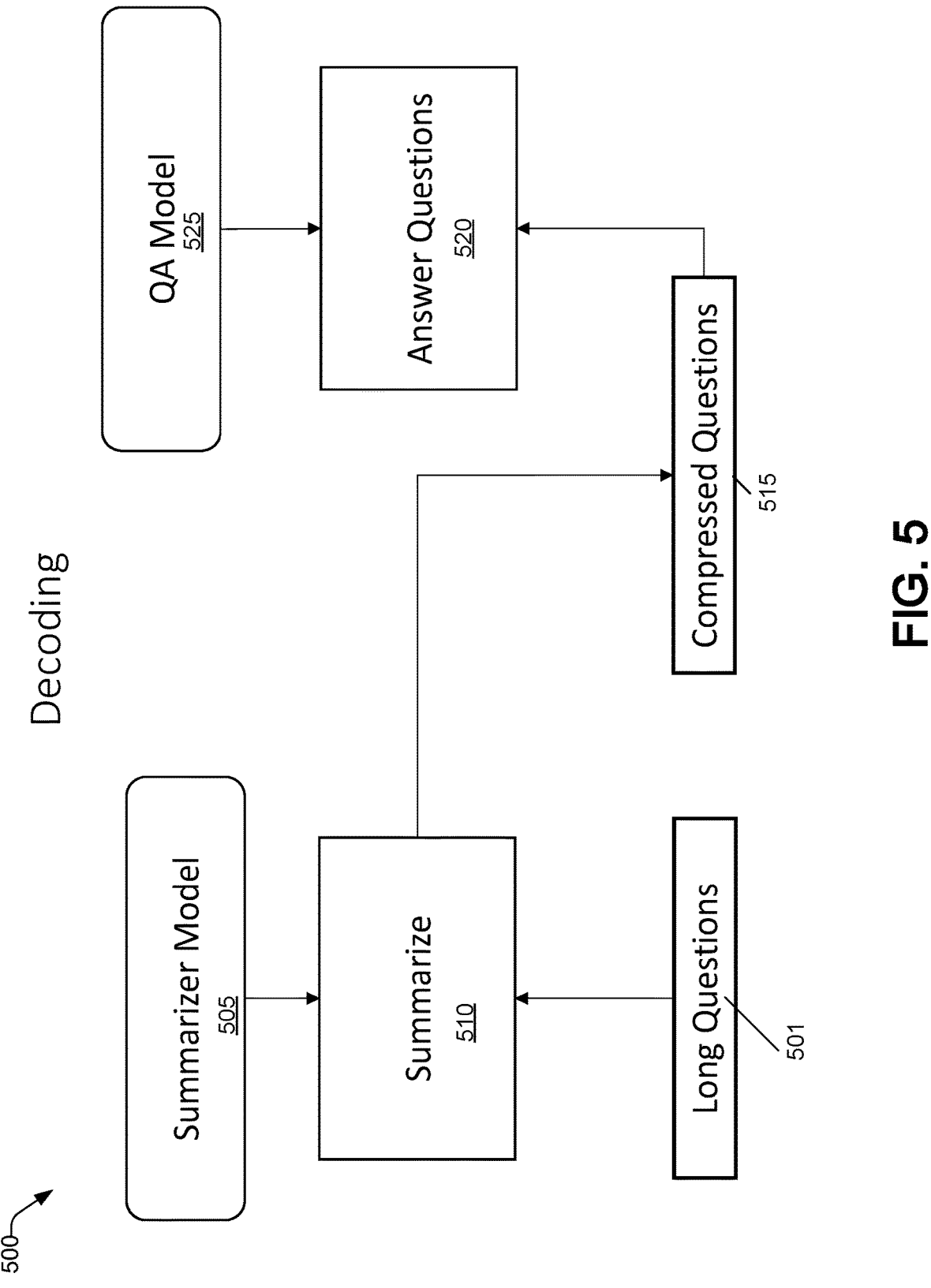
FIG. 5 illustrates a decoding operation in which long questions are reduced in length, consistent with an illustrative embodiment.

FIG. 5 illustrates a decoding operation in which long questions are reduced in length, consistent with an illustrative embodiment. The long questions 501 are summarized by the summarizer model 505. The summarizer transforms the long questions into compressed questions 515 and is provided to the QA model 525, which provides answers to the questions 520. The QA model may have labeled data from auxiliary tasks that are in the form of QA pairs from similar questions related to auxiliary tasks of the specific task. In other words, there is some commonality between the auxiliary tasks and the specific task, but they are not identical.

Figure 6:
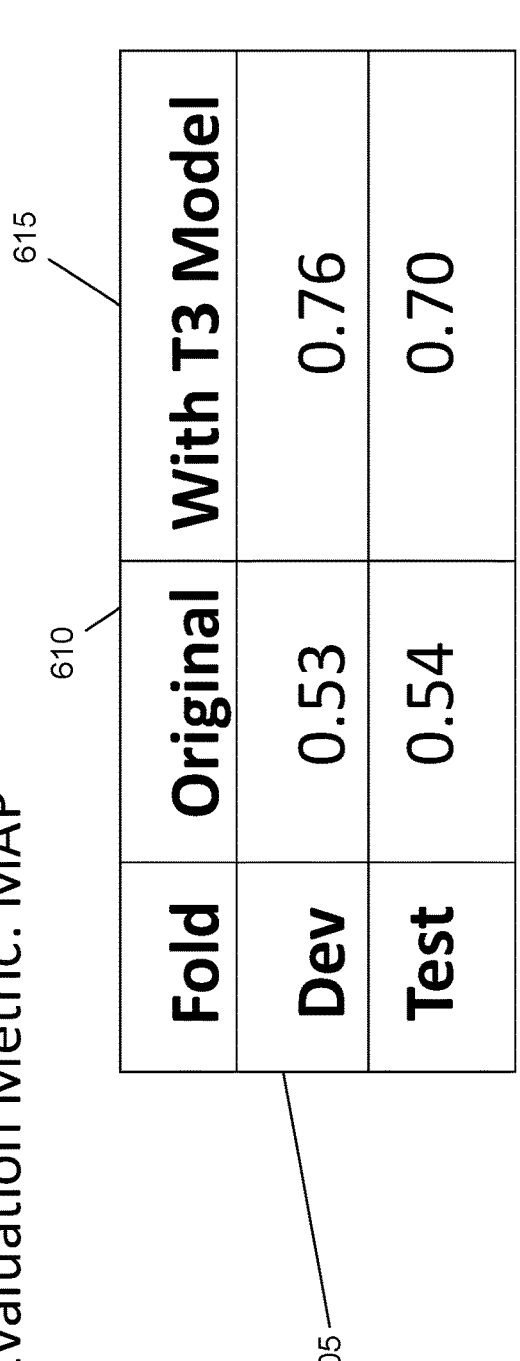
FIG. 6 illustrates the operation of a natural language processing model performing a duplicate question detection task utilizing text-to-text transformation, consistent with an illustrative embodiment.

FIG. 6 illustrates the performance of an NLP model performing a duplicate question detection task utilizing text-to-text transformation, consistent with an illustrative embodiment. The task performed was duplication question detection. In this embodiment, an input text (e.g., a question) is transformed by performing question compression/summarization by dropping sentences (in this particular embodiment). Then, the evaluation metric utilizing mean average precision (MAP) provides an accuracy rating of the original data and the compression data. In table 605 it can be seen that the text-to-transformation model 615 has an improved accuracy when compared with the computing device performing the specific task with the original input text 610.

Figure 7:
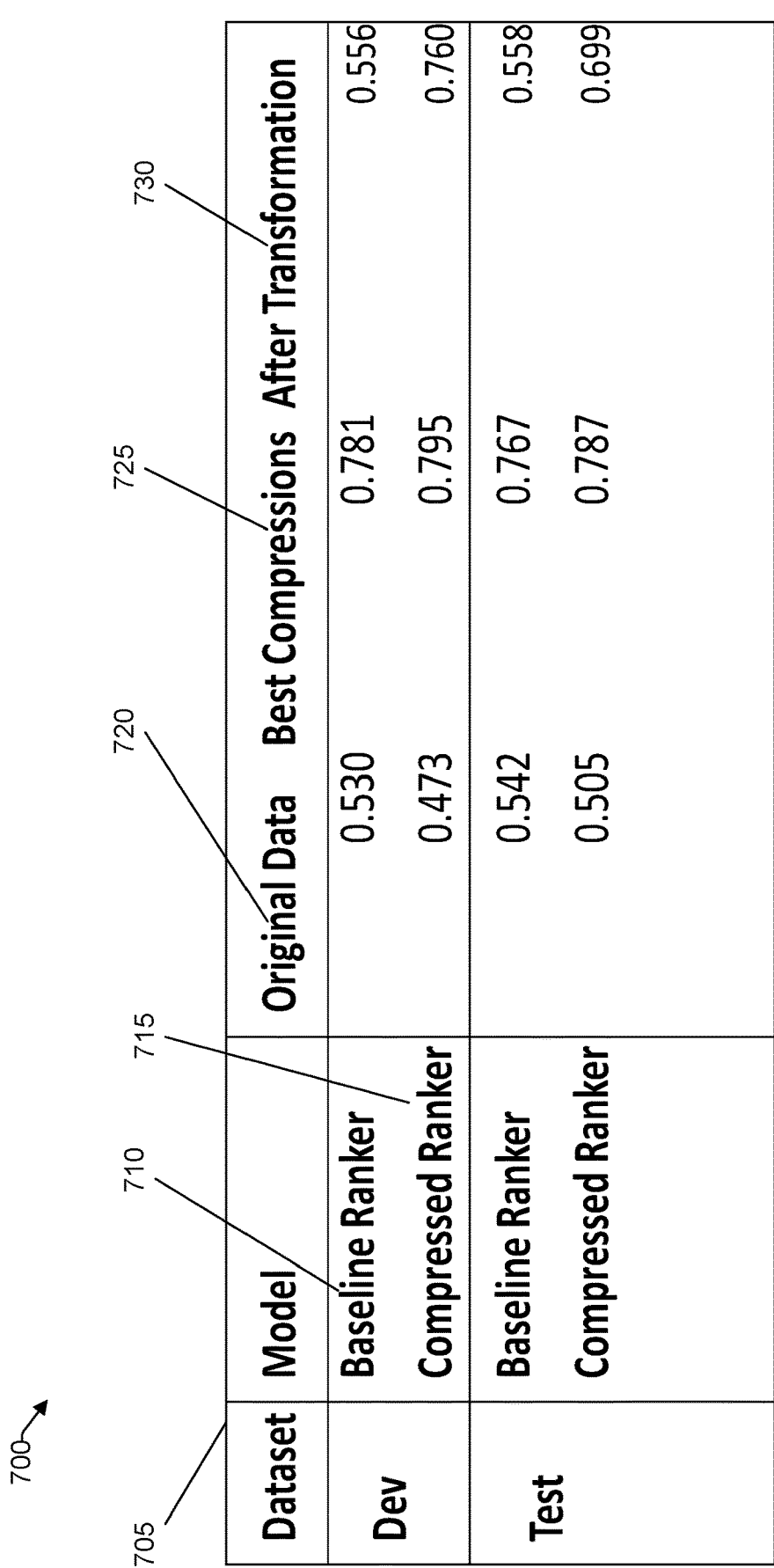
FIG. 7 illustrates the difference in performance of another natural learning process model performing a duplicate question detection task with ranked results, consistent with an illustrative embodiment.

FIG. 7 illustrates the difference in performance 700 of another NLP model performing a duplicate question detection task with ranked results, consistent with an illustrative embodiment. The table 705 shows the use of a baseline ranker 710 versus a compressed ranker 715 in the evaluation process of a device dataset and a test data set. The original data shows slightly better accuracy in performance using the baseline ranker 71. However, selecting the best compression shows a much higher accuracy in performance of a specific task, and the compressed ranker 715 shows a slightly higher accuracy than the baseline ranker 715. The third comparison is with transformation of the original data after transformation, where there is not a selection of the best compression. It is shown that using data as ranked by the compressed ranker provides much better results than the baseline ranker 715 and close to the best compression accuracy, but definitely less than the accuracy using the best compressions.

Example Process

With the foregoing overview of the example architecture, it may be helpful now to consider a high-level discussion of an example process. To that end, FIG. 8 is a flowchart illustrating a computer-implemented method of performing text-to-text transformation, consistent with an illustrative embodiment. FIG. 8 is shown as a collection of blocks, in a logical order, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform functions or implement abstract data types. In each process, the order in which the operations are described is not intended to be construed as a limitation, and any number of the described blocks can be combined in any order and/or performed in parallel to implement the process.

At operation 805, a text transformation operation is performed on an original input text of a specific task to generate a plurality of transformed text. For example, an input question 205 such as shown in FIG. 2 is transformed into a compressed question 210. As previously discussed, the text transformation operation is in some illustrative embodiments an iterative process that may be performed until certain terminating criterion has been reached. The criterion may include quality as evaluated by an evaluating algorithm with mean average precision (MAP), or some other way to measure the operation of the specific task with the original data versus the transformed data.

At operation 815, a task-specific performance metric is applied to measure an operation of the specific task using each one of the plurality of transformed text. For example, after a duplicate question detection operation is performed on an input text, a ranked score of task-specific performance metric can be used on the various iterations of transformed text and compared with the original input data.

At operation 820, a pairing each of the plurality of transformed text with the task-specific performance metric is performed. For example, Question-Answer (QA) pairs are generated of portions of the transformed text and a task-specific performance metric.

At operation 825, there is performed an updating of a training dataset to include each pairing of the plurality of transformed text with the task-specific performance metric.

For example, the QA generated at operation 820 are collected and added to the training data. There can be a selective updating of training data to increase the accuracy of the model to perform the specific task. QA pairs that are ranked lower than a certain metric, or ranked relatively lower than other QA pairs may be excluded from the updating of the training data. Thus, training data can be provided using distant supervision by labelling data without using an expert or having to access an external knowledge base, or by using auxiliary data such as emojis, hashtags, or URLs that exist in social media or other similar resource.

Example Particularly Configured Computer Hardware Platform

FIG. 9 provides a functional block diagram illustration 900 of a computer hardware platform. In particular, FIG. 9 illustrates a particularly configured network or host computer platform 900, as may be used to implement the method shown in FIG. 8.

The computer platform 900 may include a central processing unit (CPU) 904, a hard disk drive (HDD) 906, random access memory (RAM) and/or read-only memory (ROM) 908, a keyboard 910, a mouse 912, a display 914, and a communication interface 916, which are connected to a system bus 902. The HDD 906 can include data stores.

In one embodiment, the HDD 906 has capabilities that include storing a program that can execute various processes, such as machine learning, text-to-text transformation, and question compression.

In one embodiment, the HDD 906 has capabilities that include storing a program that can execute various processes, such as machine learning, text-to-text transformation, and question compression.

In FIG. 9, there are various modules shown as discrete components for ease of explanation. However, it is to be understood that the functionality of such modules and the quantity of the modules may be fewer or greater than shown.

The text-to-text-transformation module 940 is configured to control the operation of the modules 942-952 to perform the operations of text-to-text transformation, consistent with an illustrative embodiment. One such application is to modify the input from a user to a new form that works better for a specific task of interest to the user by reducing results based on irrelevant or redundant parts of a long question. For example, the compression module 942 is configured to reduce a question length of input text such as shown in FIG. 2. The questions may be reduced by several words or phrases, or even several sentences in length. The reduction of words, phrases and/or sentences in the questions provided is performed in conjunction with the distant supervision module 944. The distant supervision module 944 is configured to perform distant supervision of the training and operation of a model to perform text-to-text transformation by providing labeled data from auxiliary tasks to train the model to perform a target task. The auxiliary tasks are similar to the target task in terms of, for example, a subject or category, but may not have some of the details of the target task based on an original input text. The labeled data of the auxiliary tasks assists in the generation of labeled data for the target task, as the target task may have little or no labeled data.

The ranking model 946 is configured to perform an evaluation of various test-to-text transformations that occur in an iterative process that may occur in terms of question and answer ranking. The ranking module 946 may also rank various QA pairs that are created, and the QA pair or pairs with the highest ranking scores may be used to perform the target task. As shown in FIGS. 6 and 7, evaluating accuracy scores with mean average precision (MAP) are shown. The decoding module 948 is configured to assist in training and operation of a Summarizer Model 505 and a QA Model 525 as shown in FIG. 5. Long questions can be summarized so as to be shorter and more focused in content, and more accurate QA pairs can be generated to perform a specific task.

The reinforcement learning module 950 is configured to train NLP models in text-to-text transformation, and can be used in distant supervision for automated label generation. The communication interface module 954 is configured to receive original test input and to transmit the generated QA pairs and responses to target task to users of NLP system.

Example Cloud Platform

As discussed above, functions relating to the low bandwidth transmission of high definition video data may include a cloud. It is to be understood that although this disclosure includes a detailed description of cloud computing as discussed herein below, implementation of the teachings recited herein is not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls). Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure that includes a network of interconnected nodes.

Referring now to FIG. 10, an illustrative cloud computing environment 1000 utilizing cloud computing is depicted. As shown, cloud computing environment 1000 includes cloud 1050 having one or more cloud computing nodes 1010 with which local computing devices used by cloud consumers, such as, for example, personal digital assistant (PDA) or cellular telephone 1054A, desktop computer 1054B, laptop computer 1054C, and/or automobile computer system 1054N may communicate. Nodes 1010 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms, and/or software as services for which a cloud consumer does not need to maintain resources on a local computing device. It is understood that the types of computing devices 1054A-N shown in FIG. 10 are intended to be illustrative only and that computing nodes 1010 and cloud computing environment 1000 can communicate with any type of computerized device over any type of network and/or network addressable connection (e.g., using a web browser).

Figure 11:
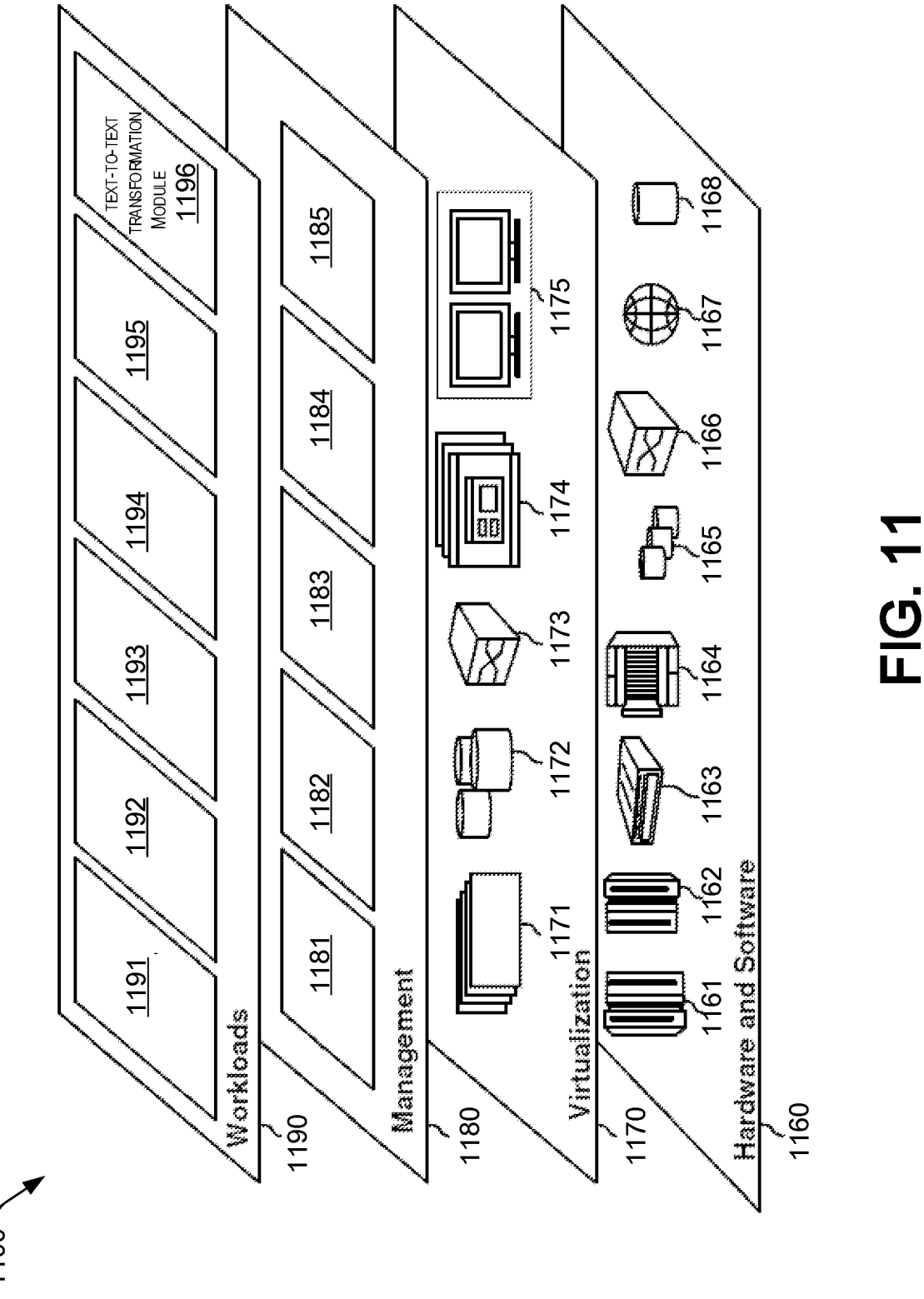
FIG. 11 depicts a set of functional abstraction layers provided by a cloud computing environment, consistent with an illustrative embodiment.

Referring now to FIG. 11, a set of functional abstraction layers 1100 provided by cloud computing environment 1000 (FIG. 10) is shown. It should be understood in advance that the components, layers, and functions shown in FIG. 11 are intended to be illustrative only and embodiments of the disclosure are not limited thereto. As depicted, the following layers and corresponding functions are provided:

Hardware and software layer 1160 include hardware and software components. Examples of hardware components include: mainframes 1161; RISC (Reduced Instruction Set Computer) architecture-based servers 1162; servers 1163; blade servers 1164; storage devices 1165; and networks and networking components 1166. In some embodiments, software components include network application server software 1167 and database software 1168.

Virtualization layer 1170 provides an abstraction layer from which the following examples of virtual entities may be provided: virtual servers 1171; virtual storage 1172; virtual networks 1173, including virtual private networks; virtual applications and operating systems 1174; and virtual clients 1175.

In one example, management layer 1180 may provide the functions described below. Resource provisioning 1181 provides dynamic procurement of computing resources and other resources that are utilized to perform tasks within the cloud computing environment. Metering and Pricing 1182 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1183 provides access to the cloud computing environment for consumers and system administrators. Service level management 1184 provides cloud computing resource allocation and management such that required service levels are met. Service Level Agreement (SLA) planning and fulfillment 1185 provide pre-arrangement for, and procurement of, cloud computing resources for which a future requirement is anticipated in accordance with an SLA.

Workloads layer 1190 provides examples of functionality for which the cloud computing environment may be utilized. Examples of workloads and functions which may be provided from this layer include: mapping and navigation 1191; software development and lifecycle management 1192; virtual classroom education delivery 1193; data analytics processing 1194; transaction processing 1195; and a text-to-text transformation module 1196 configured to perform text-to-text transformation through distant supervision, as discussed herein above.

CONCLUSION

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications, and variations that fall within the true scope of the present teachings.

The components, steps, features, objects, benefits, and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

The flowchart, and diagrams in the figures herein illustrate the architecture, functionality, and operation of possible implementations according to various embodiments of the present disclosure.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any such actual relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, the inventive subject matter lies in less than all features of a single disclosed embodiment. Thus, the following claims are hereby incorporated into the Detailed Description, with each claim standing on its own as a separately claimed subject matter.

What is claimed is:

1. A computer-implemented method of improving a machine learning training dataset by performing text-to-text transformation, the computer-implemented method comprising:

performing a text-to-text transformation operation on an original input text of a specific task to generate a plurality of transformed text, wherein the original input text corresponds to a multiple sentence question, the text-to-text transformation operation includes compressing the multiple sentence question by removing one or more portions of the multiple sentence question to generate the plurality of transformed text, each of the one or more portions of the multiple sentence question includes words, phrases, or a sentence of the multiple sentence question, and the plurality of transformed text corresponds to a summary of the multiple sentence question using fewer words than in the original input text;

applying a task-specific performance metric to measure an operation of the specific task using each of the plurality of transformed text;

pairing, based on the applying of the task-specific performance metric, each of the plurality of transformed text with the task-specific performance metric; and updating a training dataset to include each pairing of the plurality of transformed text with the task-specific performance metric.

2. The computer-implemented method of claim 1, wherein each pairing of the plurality of transformed text is provided to the training dataset after determining whether a quality criterion is satisfied.

3. The computer-implemented method of claim 1, wherein the specific task comprises at least one target task provided in the original input text; and the computer-implemented method further comprises performing a distant supervision of the text-to-text transformation operation based on a set of related auxiliary tasks having labeled data in addition to data of the specific task.

4. The computer-implemented method of claim 3, further comprising:

performing a new text transformation operation using the updated training dataset to generate a new plurality of transformed text;

applying the task-specific performance metric to measure the operation of the specific task using each of the new plurality of transformed text;

pairing, based on the applying of the task-specific performance metric, each of the new plurality of transformed text with the task-specific performance metric; and updating the training dataset to include each pairing of the new plurality of transformed text with the task-specific performance metric.

5. The computer-implemented method of claim 3, wherein:

the labeled data of the set of related auxiliary tasks includes a set of question and answer (QA) pairs; and the text-to-text transformation operation further comprises:

generating a plurality of question compression candidates from the set of QA pairs; and selecting one or more of the plurality of question compression candidates based on an answer ranking of the set of QA pairs.

6. The computer-implemented method of claim 5, wherein the plurality of question compression candidates is based on a number of words in the original input text.

7. The computer-implemented method of claim 1, wherein the updating of the training dataset is performed iteratively after performing a successively new text transformation operation, the applying of the task-specific performance metric, and pairing each successively new transformed text until a terminating criterion is satisfied.

8. The computer-implemented method of claim 7, wherein the pairing of each successively new transformed text and the task-specific performance metric is provided to the training dataset after determining whether a quality criterion is satisfied.

9. The computer-implemented method of claim 1, wherein the specific task comprises answering a specific question embedded in the multiple sentence question.

10. The computer-implemented method of claim 9, wherein the text-to-text transformation operation further comprises providing an answer to the specific question embedded in one or more relevant portions of the multiple sentence question.

11. The computer-implemented method of claim 10, wherein the providing of the answer further comprises:

determining one or more portions of the specific question that are at least one of irrelevant to providing the answer to the specific question, or redundant to at least a part of relevant portions of the specific question; and discarding the one or more portions of the specific question.

12. A computer-implemented method of improving a machine learning training dataset by performing text-to-text transformation, the computer-implemented method comprising:

receiving training examples of an original input text of a specific task;

performing a text-to-text transformation operation of the original input text into a plurality of transformed text, wherein the original input text corresponds to a multiple sentence question, the text-to-text transformation operation includes compressing the multiple sentence question by removing one or more portions of the multiple sentence question to generate the plurality of transformed text, each of the one or more portions of the multiple sentence question includes words, phrases, or a sentence of the multiple sentence question, the plurality of transformed text corresponds to a summary of the multiple sentence question using fewer words than in the original input text, and the specific task comprises at least one target task provided in the original input text;

performing a distant supervision of the text-to-text transformation operation based on a set of related auxiliary tasks having labeled data in addition to data of the at least one target task to generate training examples of a specific transformed text;

training a machine learning model to perform Natural Language Processing (NLP) based upon training data comprising the training examples of the original input text and the training examples of the specific transformed text;

receiving test data comprising a new original input text for the text-to-text transformation; and transforming the new original input text into a new transformed text using the trained machine learning model.

13. The computer-implemented method of claim 12, wherein the generated training examples of the specific transformed text comprises summarizing the multiple sentence question.

14. The computer-implemented method of claim 12, wherein the generated training examples of the specific transformed text comprises summarizing and shortening the multiple sentence question.

15. A computing device configured to improve a machine learning training dataset by performing text-to-text transformation, the computing device comprising:

a processor;

a memory coupled to the processor, the memory storing instructions to cause the processor to:

perform a text-to-text transformation operation on an original input text of a specific task to generate a plurality of transformed text, wherein the original input text corresponds to a multiple sentence question, the text-to-text transformation operation includes compression of the multiple sentence question by removal of one or more portions of the multiple sentence question to generate the plurality of transformed text, each of the one or more portions of the multiple sentence question includes words, phrases, or a sentence of the multiple sentence question, and the plurality of transformed text corresponds to a summary of the multiple sentence question using fewer words than in the original input text;

apply a task-specific performance metric to measure an operation of the specific task using each of the plurality of transformed text;

pair, based on the application of the task-specific performance metric, each of the plurality of transformed text with the task-specific performance metric; and update a training dataset to include each pairing of the plurality of transformed text with the task-specific performance metric.

16. The computing device of claim 15, wherein the specific task comprises at least one target task provided in the original input text, and the instructions further cause the processor to execution of execute a distant supervision of the text-to-text transformation operation based on a set of related auxiliary tasks having labeled data in addition to data of the specific task.

17. The computing device of claim 16, wherein:

the labeled data of the related auxiliary tasks includes a set of question and answer (QA) pairs; and the instructions further cause the processor to:

generate a plurality of question compression candidates from the set of QA pairs; and select one or more of the plurality of question com-
pression candidates based on an answer ranking of
the set of QA pairs.

18. The computing device of claim 17, wherein the
plurality of question compression candidates is based on a
number of words in the original input text.

19. The computing device of claim 15, wherein the
instructions further cause the processor to:

perform a new text transformation operation using the
updated training dataset to generate a new plurality of
transformed text;

apply the task-specific performance metric to measure the
operation of the specific task using each of the new
plurality of transformed text;

pair, based on the application of the task-specific perfor-
mance metric, each of the new plurality of transformed
text with the task-specific performance metric; and update the training dataset to include each pairing of the
new plurality of transformed text with the task-specific
performance metric.

* * * * *